Sept. 20, 1955 C. F. McARDLE 2,718,436
AIR BRAKE EQUIPMENT
Filed June 13, 1951
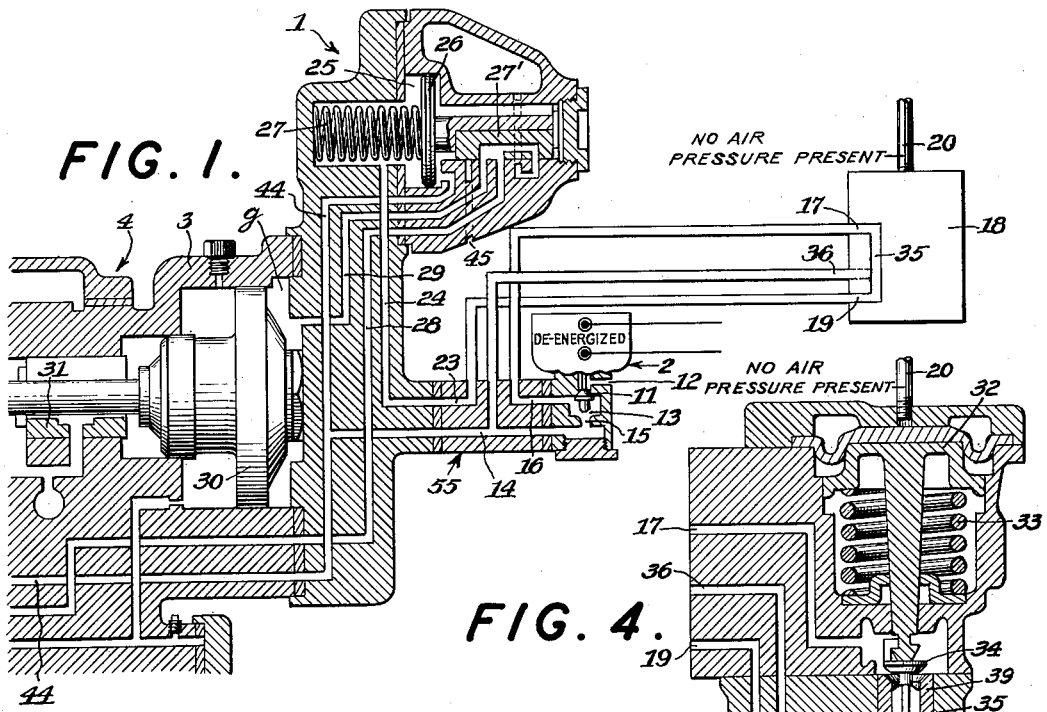
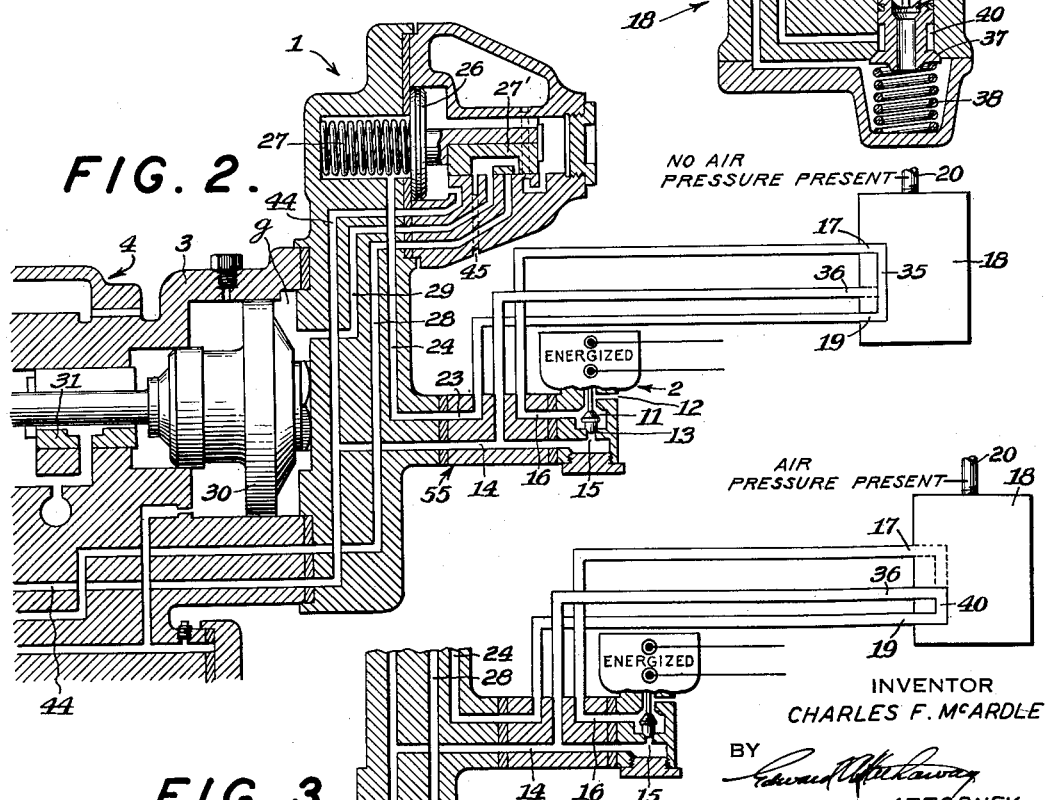
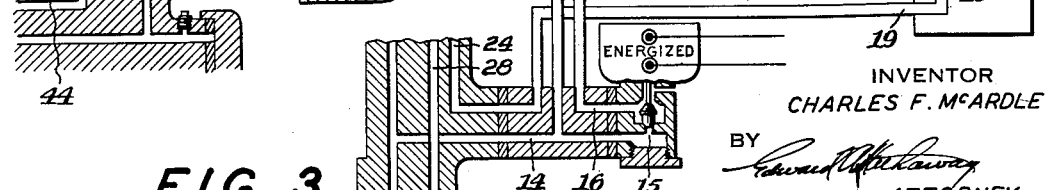
INVENTOR
CHARLES F. McARDLE
BY
ATTORNEY United States Patent Office 2,718,436
Patented Sept. 20, 1955

2,718,436

AIR BRAKE EQUIPMENT

Charles F. McArdle, Darby, Pa., assignor to Baldwin-Lima-Hamilton Corporation, a corporation of Pennsylvania Application June 13, 1951, Serial No. 231,278

3 Claims. (Cl. 303—3)

This invention relates generally to air brake equipment having a dynamic interlock magnet valve and particularly to No. 6 types of brake equipment.

Heretofore these types of systems did not allow independent brake application to be made when the interlock magnet valve was energized upon application of dynamic braking. It is desirable under certain circumstances to have independent braking while the magnet valve is energized, particularly in case the magnet valve should be inadvertently energized by reason of a short circuit, or in case some mechanical defect should make the valve remain in an energized position even though actually de-energized. Under these circumstances the locomotive would not have the benefit of independent braking and also, as is usual, automatic braking would not be available on the locomotive because it is prevented when the magnet valve is in an energized position. Thus the locomotive would be without air brakes whatsoever.

The inability to have locomotive braking during dynamic braking has been overcome in prior brake equipment generally known as 24–RL type manufactured by Westinghouse Air Brake Company but this type of equipment, while having certain operational refinements, is much more expensive from the standpoint of equipment and application cost as well as requiring more maintenance time than is the case with my improved combination which is particularly applicable to so-called No. 6 types of brake equipment. One of these latter types of equipment is described in instruction pamphlet No. 5046–15 on "6–SL Brake Equipment" published by the Westinghouse Air Brake Company with particular reference to Fig. 26, drawing No. C–45,112 thereof. Inasmuch as these types of equipment are well known in the art the same are not described in detail herein but are incorporated by reference insofar as is necessary.

One object of my invention is to provide an improved combination that will allow No. 6 types of brake equipment to use independent air braking on the locomotive at all times regardless of whether the dynamic interlock magnet valve is energized or de-energized thereby eliminating the dangers incident to a short circuited or mechanically defective magnet valve.

Another object of my invention is to accomplish independent braking during dynamic braking in No. 6 types of equipment while at the same time retaining the prior art function of making it impossible for an automatic brake application to take effect on the locomotive if the dynamic interlock magnet valve is in an energized position.

A further object is to provide an improved combination for the foregoing purpose that is extremely simple and economical in construction, operation and maintenance and can be easily and readily installed in new or existing equipment with minimum complications.

Other objects and advantages will be more apparent to those skilled in the art from the following description of the accompanying drawings in which:

Fig. 1 is a sectional view of the piston end of the application cylinder with the usual regenerative interlock cap applied thereto together with the elements which I combine therewith to form my improved combination, the dynamic interlock magnet valve being in its de-energized condition;

Fig. 2 is a view similar to Fig. 1 but showing the parts in their position when the magnet valve is energized but without application of the independent air brake;

Fig. 3 is a fragmentary view of Fig. 2 but showing the position of the air relay valve used in operation with the magnet valve when the independent air brake is applied; and Fig. 4 is an enlarged sectional view of one form of air relay valve of a type preferred to be employed in my improved combination.

For purposes of illustration, I have shown my invention applied to "6–SL" brake equipment specifically referred to in said Westinghouse pamphlet 5046–15. I have also added the well known dynamic interlock portion consisting of the usual regenerative interlock cap generally indicated at 1 on which is mounted the well known magnet valve portion generally indicated at 2. This assembly forms the cylinder head of an application cylinder 3 of the distributing valve of which only a small portion is generally indicated at 4. Inasmuch as the remainder of the distributing valve and all associated brake equipment is well known, it will be only necessary to describe the manner in which I have converted this "6–SL" type of brake equipment, or any equivalent No. 6 type of brake equipment, to my improved combination so that it may employ independent air braking for the locomotive during dynamic braking and without interfering with the usual automatic braking whenever it is desired. The magnet valve is energized when the locomotive is in dynamic braking, and is de-energized when it is not in dynamic braking for the reason that the magnet valve is wired into the dynamic control circuit in a well known manner.

*Magnet valve de-energized.*—In this de-energized state, as shown in Fig. 1, an upper valve 11 of the magnet valve portion is seated to close a magnet valve exhaust port 12 while a lower valve 13 is unseated to provide a connection from a main air reservoir (not shown) through a passage 14, a magnet valve port 15 and a passage 16 to a port 17 of a relay air valve 18. While this relay valve per se, Fig. 4, is well known in the trade it is used in a new cooperative manner as an element of my improved combination as will be presently disclosed. The port 17 is connected to a passage 19 when there is no pressure in a pipe 20 which is in constant communication with a usual so-called "distributing valve release pipe" (not shown) in which application pressure is present only when an independent brake application has been made by the engineer. The pipe 20 is therefore an extension or a branch of the "release pipe." The main reservoir air flows from port 19 back through air-transmission passages 23 and 24 to the spring side 25 of an interlock piston 26. Thus, main reservoir air pressure plus the force of a spring 27 causes the piston 26 and a slide valve 27' integrally connected therewith to move to the extreme right position as shown in Fig. 1. If either an automatic or independent brake application is now made, application air will be directed through passages 28 and 29 to an application cylinder space *g* to cause an application piston 30 and a slide valve assembly 31 to move to the left. When the application piston and slide valve moves to the left it functions in a manner well known in the art to disconnect the brake cylinder (not shown) from exhaust and connect it to the main reservoir supply to apply the brakes.

The air relay valve 18 is specifically shown in Fig. 4 as comprising a diaphragm covered piston 32 normally biased upwardly by a spring 33 to lift a valve 34. When this valve is opened, air in passage 17 flows downwardly through a passage 35 past a fluted guide stem of valve 34 to passage 19. During this time, passage 17 cannot communicate with a second main reservoir air supply pipe 36 because a valve 37 is held closed by a spring 38. The valve 37 and passage 35 are formed in a slidable sleeve 39 whose upper end forms the seat for valve 34. When application pressure is admitted through pipe 20 the piston 32 moves downwardly to seat valve 34 and unseat valve 37 whereby main reservoir air from passage 36 flows through an annular space 40 to passage 19 to the spring side of the piston 26 to maintain this piston in its right hand position. So long as the piston is in this position either independent or automatc braking may be applied.

*Magnet valve energized.*—In this energized state, Fig. 2, which is brought about by application of dynamic braking or by an inadvertent contingency such as a short circuit or by a mechanical failure of the valve, the upper valve 11 of the magnet valve portion is unseated and the valve 13 is seated, assuming no pressure is in pipe 20. Also, the valve 34 of the air relay valve is open and valve 37 closed whereby the spring side 25 of the interlock cap piston 26 is exhausted to atmosphere through passages 24, 23, 19, 35 and 17 to magnet valve exhaust port 12. It might be pointed out that heretofore in "6-SL" brake equipment this air pressure was exhausted to atmosphere directly from passage 24 to magnet exhaust port 12 whereas in my present arrangement the exhaust takes place through the air relay valve 18 in which the passages 17 and 19 are connected when there is no application pressure in pipe 20 such as is the case under all circumstances except when an independent brake application is made. With the loss of air pressure on the spring side of piston 26, this piston and its slide valve 27' are moved to the extreme left position by ever present main reservoir pressure on the right side of piston 26, the main reservoir pressure being supplied in the usual manner through a passage 44. On assuming this left hand position, Fig. 2, the valve 27' closes off passage 28 and connects application cylinder space g to atmosphere through passage 29 and an interlock cap body exhaust port 45. Hence, during dynamic braking, any application air which might be supplied as the result of an automatic brake application will be blocked in passage 28 by the interlock valve 27' thereby preventing the automatic braking application being effective on the locomotive.

Heretofore the blocked passage 28 in prior dynamic interlocks of No. 6 types of systems not only prevented the application of automatic braking on the locomotive but also prevented independent brake application. However, with my improved arrangement of interposing the valve 18 between the magnet valve and the regenerative interlock cap, I retain the function of former No. 6 types of systems of preventing automatic braking of the locomotive during dynamic braking but additionally accomplish the function of allowing an independent brake application to be made during such dynamic braking. To do this the engineer moves the usual independent brake handle to the application zone to supply air to pipe 20 so as to close valve 34 and open valve 37, thereby to admit reservoir air pressure through pipe 36, Fig. 3, to pipe 19 and thence to the spring side 25 of interlock cap piston 26 to move it to the right (the position shown in Fig. 1). Application air is now supplied through passages 28 and 29 to the application cylinder space g to move piston 30 to the left to make an independent brake application.

It will be understood that application air during automatic braking is not supplied to pipe 20 and hence relay valve 18 is not operated to by-pass the magnet valve when energized as is done during independent brake application. The pipe 20 is supplied with application air only by the independent brake valve, which as is well known is mechanically separate from the automatic brake valve, thereby rendering the relay valve 18 responsive only to operation of independent braking.

It is preferable that valve spring 33 be of such low stiffness that it permits an application air pressure in pipe 20 of about 10 lbs. p. s. i. to close valve 34 and open valve 37 in order that when the magnet valve is energized and the interlock piston is in its left position for blocking passage 28 there will not be a build-up of a large application pressure in this passage before it is uncovered by movement of the interlock piston to the right. By utilizing a low pressure it will, immediately upon opening of passage 28, actuate the application piston 30 under the same low pressure and thus permit, if the engineer so desires, a gradual application of the brakes. If the spring 33 were responsive only to an initially high application pressure, a corresponding high pressure would be present in pipe 28 to be suddenly applied to the application piston and thus suddenly apply the brakes. Of course, with my present arrangement, there is nothing to prevent the engineer, if he so desires, from supplying a high application pressure to be immediately effective on the application piston.

From the disclosure herein it is seen that I have provided improved "6-SL" type brake equipment, or any of its No. 6 equivalents, whereby it is possible to use independent air brakes at all times regardless of the energization status of the magnet valve portion while at the same time keeping automatic brake applications from taking effect on the locomotive when the magnet valve portion is in an energized position. These two results, among possible others that might be present, are readily accomplished by incorporating into "6-SL" brake arrangement a minimum number of parts such as the relay valve 18, functioning as a magnet valve by-pass, and the insert element 55 disposed between the magnet valve and the regenerative interlock cap. The insert 55 is simply a convenient element for permitting a standard type of valve 18 to be interposed between the magnet valve and regenerative cap although the passages in valve 18 could be arranged to permit it to be directly substituted in place of element 55. As a result of this relatively simple structural change I not only accomplish a very definite improved mode of operation but do so with a highly reliable arrangement at a minimum cost regardless of whether the structural change is made to new or existing locomotives. With my new interlock arrangement the possibility of making an independent brake application, even though the magnet valve portion 2 is in an energized status, is a reality because the position of the interlock cap piston and slide valve assembly can be caused to assume its extreme right position by the movement of the independent brake valve handle into the application zone by the engineer. The mere movement of the brake valve handle to the application zone immediately actuates the air relay valve 18 so that application air is permitted to flow through the interlock cap valve 27' to the application piston 30 which thereupon moves to the left to connect the main reservoir air supply to the brake cylinders in the well known manner. Nor does the air relay valve 18 interfere in any way with automatic application whenever desired.

It will, of course, be understood that various changes in details of construction and arrangement of parts may be made by those skilled in the art without departing from the spirit of the invention as set forth in the appended claims.

I claim:

1. Air brake equipment having an application piston and cylinder, application cylinder passages for conducting either automatic or independent application air to the application cylinder to apply brakes and to exhaust air therefrom to relieve the brakes, a regenerative interlock cap having an interlock valve adapted to control said passages so as to allow said automatic or independent brake applications or to relieve the brakes, pneumatically controlled power means for actuating said interlock valve to effect its said operations for controlling the operation of said piston so as to render it effective or ineffective to apply brakes, a magnet valve adapted to be energized upon application of dynamic braking, magnet valve controlled passages interposed between the magnet valve and said pneumatically controlled power means to control the power means and the interlock valve to prevent automatic application air being supplied to the application cylinder when the magnet valve is energized upon occurrence of dynamic braking; and means, controlled by independent application air, also interposed between the magnet valve and said power means for controlling said interlock valve so that independent application air may be supplied to the application piston through said application piston through said application cylinder passages so as to apply brakes even though the magnet valve remains energized.

2. The combination set forth in claim 1 further characterized in that the interposed means which is controlled by independent application air includes pneumatic passages for controlling said power means and an air relay valve controlled by independent application air for controlling such passages to allow supply of independent application air to the application cylinder.

3. Air brake equipment having an application piston and cylinder, application supply and exhaust passages adapted to be connected to or disconnected from said cylinder, a dynamic interlock piston and cylinder and valve actuated thereby, means to bias the interlock piston and valve in one direction to connect said application air supply passage to the application cylinder and to close said exhaust passage therefrom, a reservoir air-transmission passage connected to said interlock cylinder on the side of its piston for supplementing said biasing action upon admission of reservoir air thereto, a second main reservoir air passage in constant communication with said interlock cylinder on the opposite side of its piston whereby upon release of pressure from the biased side the constant air pressure on the other side thereof causes movement of the interlock valve to close the application air supply passage to the application cylinder and to open said exhaust passage therefrom, a magnet valve adapted to be energized when dynamic braking is applied so as to exhaust air from the biased side of the interlock piston thereby to render the application piston ineffective for applying brakes, a release pipe, a by-pass valve actuated by application air if present in said release pipe, said bypass valve being connected between said magnet valve and interlock cap cylinder by passages from the constant source of main reservoir air pressure through the magnet valve when de-energized and thence through said by-pass valve to said reservoir air-transmission passage leading to the biasing side of the interlock piston thereby to bias the interlock piston valve to its position for establishing communication between the application air supply passage and the application cylinder so that the latter will be ready to apply brakes when application air is admitted thereto during either automatic or independent air brake operation, an exhaust passage in said magnet valve adapted to be uncovered when the magnet valve is energized on application of dynamic braking thereby to exhaust main reservoir air pressure from the biasing side of the interlock cap piston so that the constant air pressure on the other side thereof moves the interlock valve to close the application air supply passage to the application cylinder and to open the exhaust passage therefrom whereby the application piston is rendered ineffective for applying brakes, and means for actuating said by-pass valve upon supply of independent application air pressure in the release pipe so that main reservoir air pressure is connected through the by-pass valve to said air-transmission passage leading to the biasing side of the interlock piston thereby to move the interlock valve to its position for connecting the application air supply passage to the application cylinder for effecting independent air brake application even though the magnet valve is in an energized dynamic braking position.

References Cited in the file of this patent
UNITED STATES PATENTS

| | | |
|---|---|---|
| 1,439,467 | Farmer | Dec. 19, 1922 |
| 1,621,403 | Hamilton | Mar. 15, 1927 |
| 2,058,016 | Hewitt | Oct. 20, 1936 |
| 2,445,680 | Linhart | July 20, 1948 |